(12) United States Patent
Wang et al.

(10) Patent No.: US 9,578,434 B2
(45) Date of Patent: Feb. 21, 2017

(54) METHOD FOR MAKING DIAPHRAGM

(71) Applicants: Tsinghua University, Beijing (CN); HON HAI PRECISION INDUSTRY CO., LTD., New Taipei (TW)

(72) Inventors: Jia-Ping Wang, Beijing (CN); Liang Liu, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 754 days.

(21) Appl. No.: 13/942,457

(22) Filed: Jul. 15, 2013

(65) Prior Publication Data

US 2013/0309400 A1 Nov. 21, 2013

Related U.S. Application Data

(63) Continuation of application No. 12/824,335, filed on Jun. 28, 2010, now Pat. No. 8,548,188.

(30) Foreign Application Priority Data

Oct. 23, 2009 (CN) .......................... 2009 1 0110321

(51) Int. Cl.
*H04R 31/00* (2006.01)
*H04R 23/00* (2006.01)
*H04R 13/02* (2006.01)
*H04R 9/04* (2006.01)
*H04R 5/02* (2006.01)
(Continued)

(52) U.S. Cl.
CPC ............... *H04R 31/003* (2013.01); *B32B 1/08* (2013.01); *B32B 5/02* (2013.01); *B32B 5/16* (2013.01); *B82B 3/0047* (2013.01); *B82Y 10/00* (2013.01); *B82Y 30/00* (2013.01); *B82Y 40/00* (2013.01); *H01B 1/04* (2013.01); *H04R 1/025* (2013.01); *H04R 5/02* (2013.01); *H04R 7/125* (2013.01); *H04R 9/046* (2013.01); *H04R 13/02* (2013.01); *H04R 23/002* (2013.01); *C01B 31/0233* (2013.01); *H04R 2307/023* (2013.01); *Y10T 428/13* (2015.01); *Y10T 428/249978* (2015.04)

(58) Field of Classification Search
CPC ......... H04R 31/003; H04R 1/025; H04R 5/02; H04R 13/02; H04R 23/002; H04R 9/046; B82Y 10/00; B82Y 30/00; B82Y 40/00; C01B 31/0233; B32B 1/08; B32B 5/02; B32B 5/16; B82B 3/0047; H01B 1/04
USPC ..... 427/228, 372.2; 381/413, 394, 164, 386; 367/140; 911/742; 977/932; 181/167
See application file for complete search history.

(56) References Cited

U.S. PATENT DOCUMENTS 6,863,942 B2 * 3/2005 Ren ..................... B82Y 10/00
313/495
7,437,938 B2 * 10/2008 Chakraborty ............. G01F 1/28
73/714

(Continued)

FOREIGN PATENT DOCUMENTS

EP 2056383 5/2009

*Primary Examiner* — David Warren
*Assistant Examiner* — Christina Schreiber
(74) *Attorney, Agent, or Firm* — Zhigang Ma

(57) ABSTRACT

A method for making a diaphragm is disclosed. The method includes the steps of: providing a carbon nanotube film structure; soaking the carbon nanotube film structure with a polymer; and carbonizing the carbon nanotube film structure infiltrated in the polymer, the polymer being carbonized to an amorphous carbon structure.

14 Claims, 14 Drawing Sheets

(51) Int. Cl.
*H04R 1/02* (2006.01)
*B82Y 10/00* (2011.01)
*B82Y 30/00* (2011.01)
*B82Y 40/00* (2011.01)
*B82B 3/00* (2006.01)
*C01B 31/02* (2006.01)
*B32B 1/08* (2006.01)
*B32B 5/02* (2006.01)
*B32B 5/16* (2006.01)
*H01B 1/04* (2006.01)
*H04R 7/12* (2006.01)

(56) References Cited

U.S. PATENT DOCUMENTS

| | | | | | |
|---|---|---|---|---|---|
| 7,745,302 | B2* | 6/2010 | Zhang | | H01J 37/20 257/E21.006 |
| 8,068,626 | B2* | 11/2011 | Jiang | | H04R 23/002 381/164 |
| 8,073,164 | B2* | 12/2011 | Jiang | | H04R 23/002 381/164 |
| 8,253,122 | B2* | 8/2012 | Feng | | A61N 5/06 250/504 R |
| 8,288,723 | B2* | 10/2012 | Zhang | | H01J 37/20 250/306 |
| 8,323,607 | B2* | 12/2012 | Liu | | B82B 3/0047 423/447.1 |
| 8,515,117 | B2* | 8/2013 | Liu | | H04R 9/046 367/140 |
| 2006/0098389 | A1* | 5/2006 | Liu | | B82Y 10/00 361/502 |
| 2007/0191534 | A1* | 8/2007 | Taki | | C08F 20/36 524/494 |
| 2008/0095694 | A1* | 4/2008 | Nakayama | | B82B 1/00 423/445 B |
| 2008/0170982 | A1* | 7/2008 | Zhang | | B82Y 10/00 423/447.3 |
| 2009/0045005 | A1* | 2/2009 | Byon | | H04R 7/02 181/167 |
| 2009/0074228 | A1* | 3/2009 | Mango, III | | H04R 31/003 381/432 |
| 2009/0110897 | A1* | 4/2009 | Humfeld | | B32B 7/14 428/221 |
| 2009/0117434 | A1* | 5/2009 | Liu | | H01M 8/0234 429/494 |
| 2009/0197082 | A1* | 8/2009 | Jiang | | H01B 1/04 428/367 |
| 2009/0220767 | A1* | 9/2009 | Schlogl | | B01J 21/18 428/323 |
| 2009/0226704 | A1* | 9/2009 | Kauppinen | | B82Y 30/00 428/323 |
| 2009/0268559 | A1* | 10/2009 | Jiang | | H04R 23/002 367/140 |
| 2009/0272946 | A1* | 11/2009 | Lu | | H01B 1/04 252/511 |
| 2009/0296528 | A1* | 12/2009 | Jiang | | H04R 23/002 367/140 |
| 2010/0008021 | A1* | 1/2010 | Hu | | C01B 31/02 361/502 |
| 2010/0046784 | A1* | 2/2010 | Jiang | | H04R 23/002 381/386 |
| 2010/0151297 | A1* | 6/2010 | Zhang | | H01M 4/8605 429/483 |
| 2010/0188934 | A1* | 7/2010 | Qian | | H04R 23/002 367/140 |
| 2010/0239488 | A1* | 9/2010 | Zettl | | B82B 3/00 423/447.1 |
| 2010/0267883 | A1* | 10/2010 | Bhatt | | B82Y 30/00 524/495 |
| 2011/0027162 | A1* | 2/2011 | Steiner, III | | B82Y 30/00 423/440 |
| 2011/0038504 | A1* | 2/2011 | Liu | | F16F 15/03 381/392 |
| 2011/0038505 | A1* | 2/2011 | Liu | | H04R 9/046 381/407 |
| 2011/0042649 | A1* | 2/2011 | Duvall | | B82Y 10/00 257/27 |
| 2011/0063613 | A1* | 3/2011 | Sun | | G01N 21/65 356/301 |
| 2011/0075878 | A1* | 3/2011 | Liu | | H04R 9/046 381/394 |
| 2011/0096952 | A1* | 4/2011 | Wang | | H04R 7/125 381/386 |
| 2011/0096953 | A1* | 4/2011 | Liu | | B82Y 30/00 381/398 |
| 2011/0183180 | A1* | 7/2011 | Yu | | H01G 11/36 429/128 |
| 2011/0318984 | A1* | 12/2011 | Liu | | B82B 3/0047 442/189 |
| 2012/0250908 | A1* | 10/2012 | Jiang | | H04R 23/002 381/164 |
| 2013/0301868 | A1* | 11/2013 | Liu | | H04R 9/046 381/413 |
| 2013/0309400 | A1* | 11/2013 | Wang | | H04R 7/125 427/228 |
| 2014/0287176 | A1* | 9/2014 | Galloway | | C08J 3/201 428/36.4 |

* cited by examiner

METHOD FOR MAKING DIAPHRAGM

RELATED APPLICATIONS

This application is a continuation application of U.S. patent application Ser. No. 12/824,335, filed Jun. 28, 2010, entitled, "DIAPHRAGM, METHOD MAKING THE SAME AND LOUDSPEAKER USING THE SAME," which claims all benefits accruing under 35 U.S.C. §119 from China Patent Application No. 200910110321.6, filed on 2009/10/23, in the China Intellectual Property Office.

BACKGROUND

1. Technical Field

The present disclosure relates to a diaphragm, a method making the same, and a loudspeaker using the same.

2. Description of Related Art

An electro-dynamic loudspeaker typically includes a diaphragm, a bobbin, a voice coil, a damper, a magnet, and a frame. The voice coil is an electrical conductor and is placed in the magnetic field of the magnet. By applying an electric signal to the voice coil, a mechanical vibration of the diaphragm is produced by the interaction between the electromagnetic field produced by the voice coil and the magnetic field of the magnets, thus producing sound waves by kinetically pushing the air. The diaphragm will reproduce the sound pressure waves, corresponding to the electric signals.

To evaluate the loudspeaker, a sound volume is a decisive factor. The sound volume of the loudspeaker relates to an input power of the electric signals and the conversion efficiency of the energy. However, when the input power is increased to certain levels, the diaphragm could deform or even break, thereby causing audible distortion.

What is needed, therefore, is to provide a diaphragm and a loudspeaker using the same with high strength and Young's modulus.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
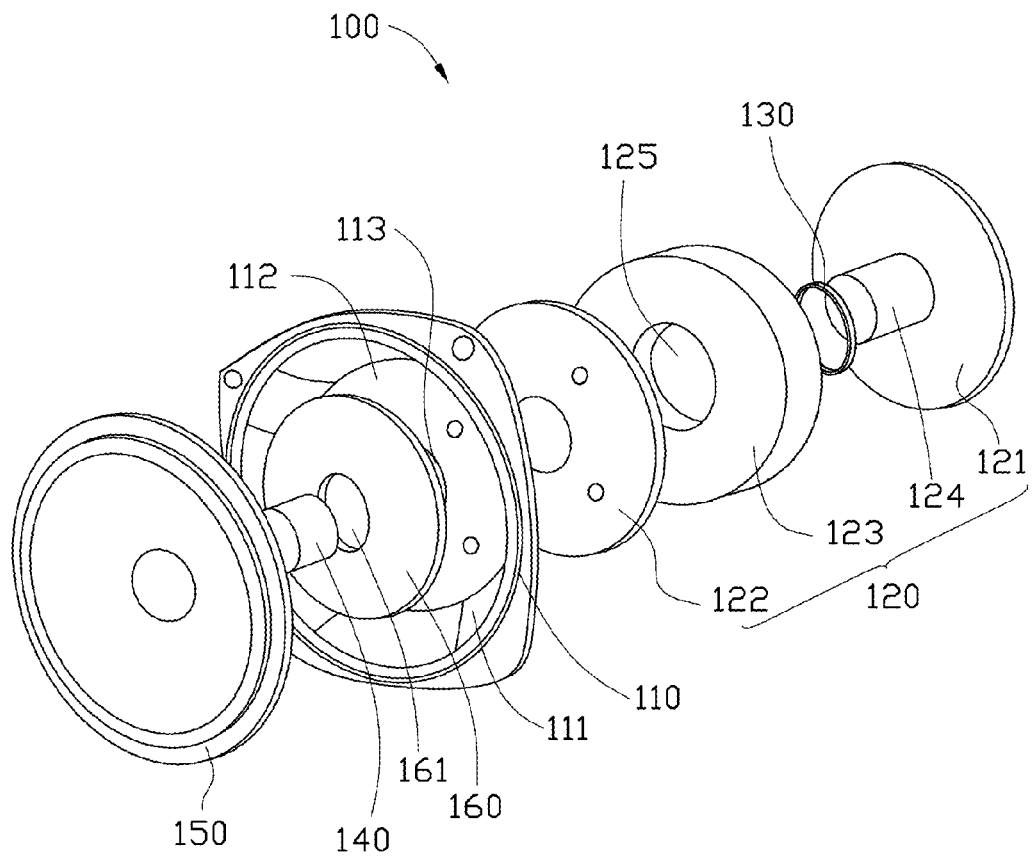
FIG. 1 is a schematic structural view of an embodiment of a loudspeaker.
Figure 2:
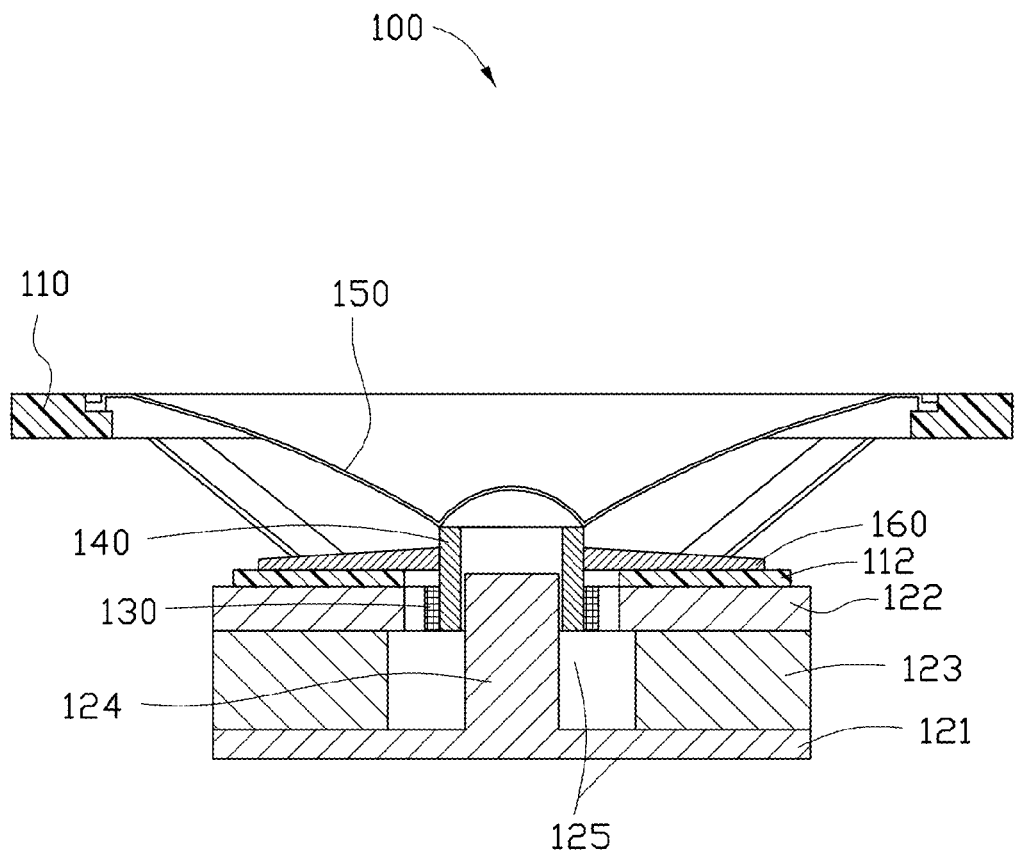
FIG. 2 is a cross-sectional view of the loudspeaker of FIG. 1.

Referring to FIG. 1 and FIG. 2, one embodiment of a loudspeaker 100 is shown. The loudspeaker 100 includes a frame 110, a magnetic circuit 120, a voice coil 130, a bobbin 140, a diaphragm 150 and a damper 160.

The frame 110 can be mounted on an upper side of the magnetic circuit 120. The voice coil 130 can be received in the magnetic circuit 120. The voice coil 130 can wind around the voice coil bobbin 140. An outer rim of the diaphragm 150 can be fixed to an inner rim of the frame 110, and an inner rim of the diaphragm 150 can be fixed to an outer rim of the bobbin 140 placed in the magnetic circuit 120.

The frame 110 can be a truncated cone with an opening on one end and includes a hollow cavity 111 and a bottom 112. The hollow cavity 111 can receive the diaphragm 150 and the damper 160. The bottom 112 can have a center hole 113. The center pole 124 can be extended through the center hole 113. The bottom 112 of the frame 110 can be fixed to the magnetic circuit 120.

The magnetic circuit 120 can include a lower plate 121, an upper plate 122, a magnet 123, and a center pole 124. The magnet 123 can be sandwiched by the lower plate 121 and the upper plate 122. The upper plate 122 and the magnet 123 can be circular, and define a substantially cylindrical shaped space in the magnetic circuit 120. The center pole 124 can be received in the substantially cylindrical shaped space and extend through the center hole 113. The center pole 124 can extend from the lower plate 121 to the upper plate 122 to define a magnetic gap 125 with the magnet 123. The magnetic circuit 120 can be fixed on the bottom 112 via the upper plate 122. The upper plate 122 can be fixed on the bottom 112 via adhesive or mechanical force. In one embodiment, according to FIG. 1, the upper plate 122 is fixed on the bottom 112 by screws (not shown).

The voice coil 130 wound on the bobbin 140 can be a driving member of the loudspeaker 100. The voice coil 130 can be made of conducting wire. When the electric signals are input into the voice coil 130, the variation of the electric signals can form a magnetic field. The interaction of the magnetic field caused by the voice coil 130 and the magnetic circuit 120 can produce the vibration of the voice coil 130. The vibration of the voice coil 130 causes the voice coil bobbin 140 to vibrate, which in turn, causes the diaphragm 150 fixed on the voice coil bobbin 140 to vibrate. The vibration of the diaphragm 150 causes the loudspeaker 100 to produce sound.

The bobbin 140 can be light in weight and have a hollow structure. The center pole 124 can be disposed in the hollow structure and spaced from the bobbin 140. When the voice coil 130 vibrates, the bobbin 140 and the diaphragm 150 also vibrate with the voice coil 130 to produce sound.

The damper 160 has a through hole 161 therein to define an inner rim. The inner rim of the damper 160 can be fixed to the bobbin 140. An outer rim of the damper 160 can be fixed to the frame 110. Thus, the damper 160 can mechanically hold the diaphragm 150 connected to the bobbin 140. The damper 160 can be a substantially ring-shaped plate having radially alternating circular ridges and circular furrows. Simultaneously, the damper 160 can include a plurality of concentric rings. The ridges and the furrows can be sawtooth shaped, wave shaped, involute shaped, or combinations thereof. In one embodiment, the ridges and the furrows are involute shape. The damper 160 can be formed by means of hot pressing. The damper 160 can have a thickness of about 1 micrometer to about 1 millimeter.

A plurality of conductive wires (not shown) can be disposed on the damper 160. The connective wires can be fixed on the damper 160 via adhesive or mechanical force. The conductive wires electrically connect the voice coil 130 to a power source. When the voice coil 130 moves up and down, joints formed by the conductive wires voice coil 130 are difficult to break, because a buffer is formed by the damper 160.

Figure 3:
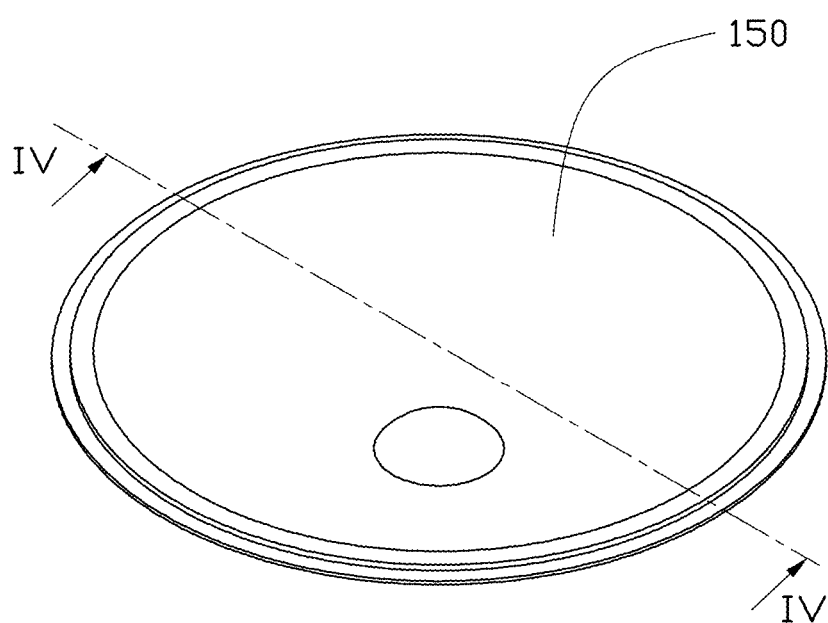
FIG. 3 is a schematic structural view of an embodiment of a diaphragm.
Figure 4:
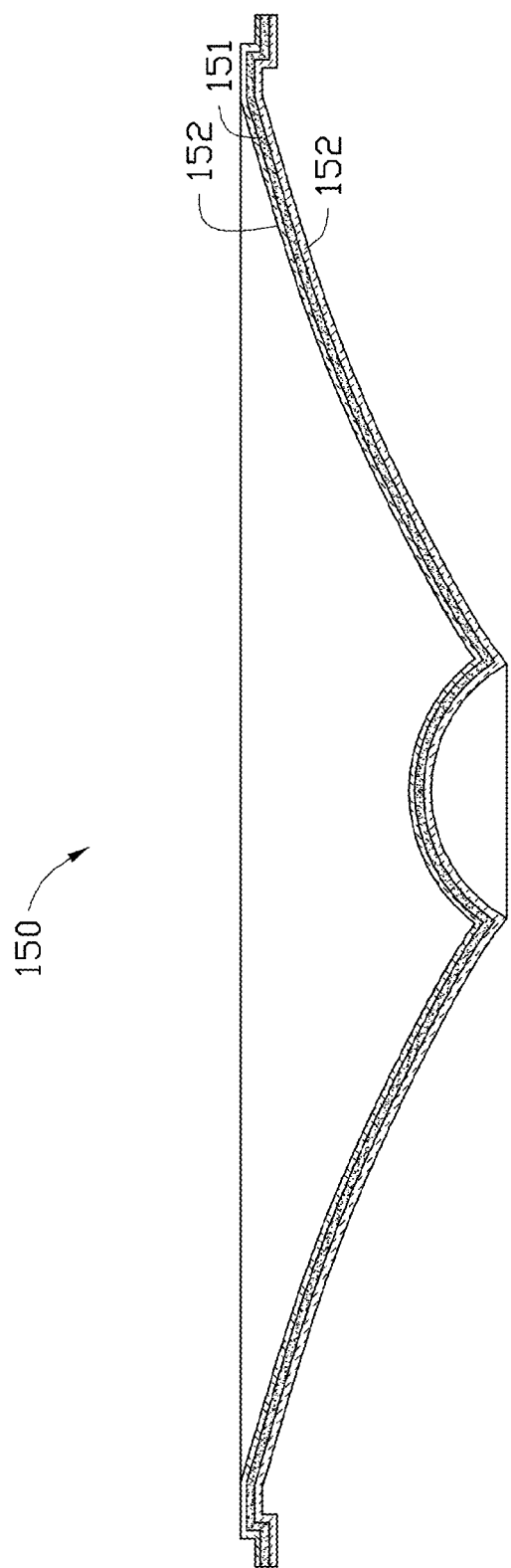
FIG. 4 is a cross-sectional view of the diaphragm.

The diaphragm 150 is a sound producing member of the loudspeaker 100. The diaphragm 150 can have a conical shape when used in a large sized loudspeaker 100. If the loudspeaker 100 has a smaller size, the diaphragm 150 can have a planar circular shape or a planar rectangular shape. In one embodiment, according to FIG. 3 and FIG. 4, the diaphragm 150 has a conical shape. The peak or the center of the diaphragm 150 can be fixed to the bobbin 140 via adhesive or mechanical force. An outer rim of the diaphragm 150 can be fixed to the frame 110. As shown in FIG. 4, a contour of the diaphragm 150 has a domed central part and an edge part integrally formed with the domed central part. The edge part extends outwardly and upwardly from a circular edge of the domed central part.

Referring to FIG. 4, the diaphragm 150 can include a carbon nanotube film structure 151 and an amorphous carbon structure 152 composited with the carbon nanotube film structure 151 to form a stratiform composite structure.

Figure 5:
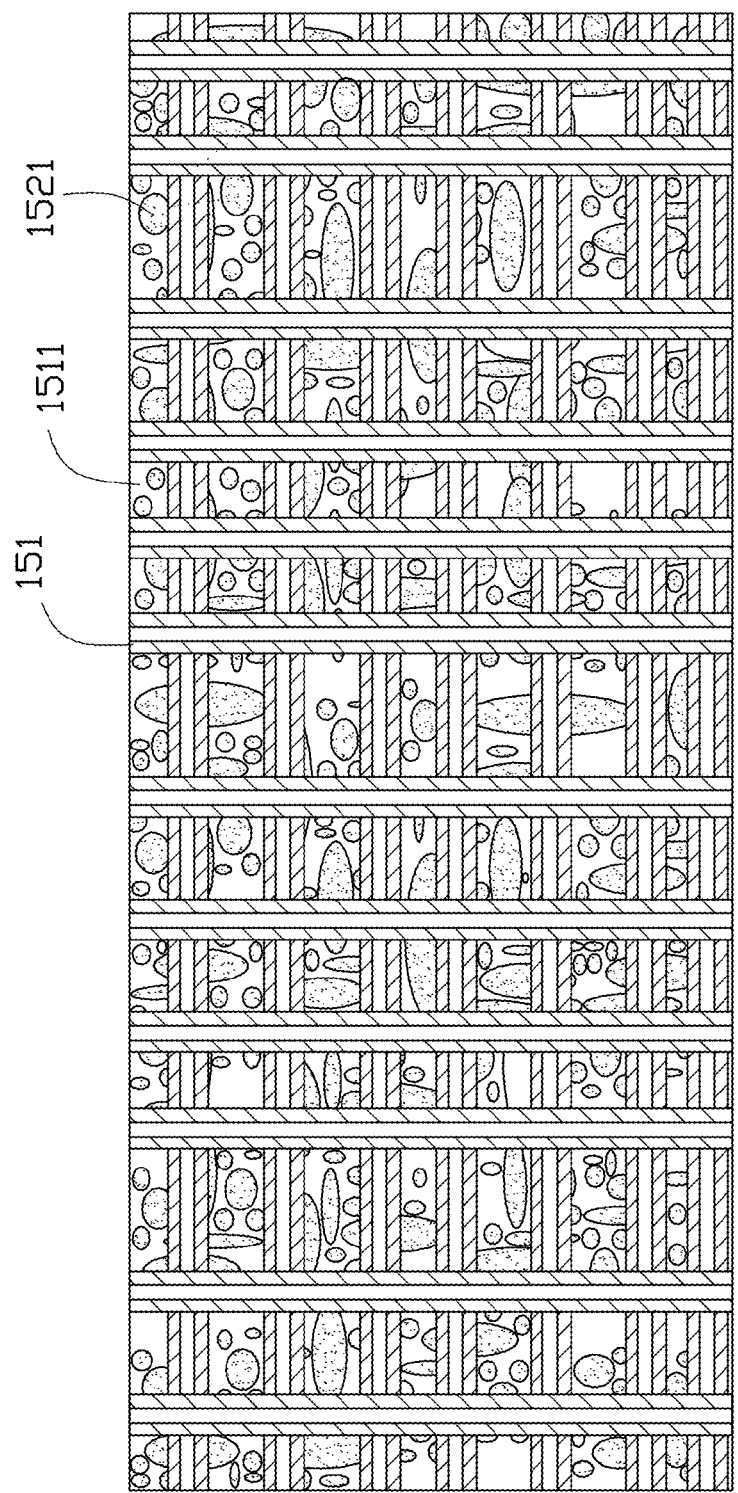
FIG. 5 is a magnification of a cross-sectional view of a part of a carbon nanotube composite structure of the diaphragm.

The carbon nanotube film structure 151 defines a plurality of micropores 1511 as shown in FIG. 5. The carbon nanotube film structure 151 is capable of forming a free-standing structure. The term "free-standing structure" can be defined as a structure that does not have to be supported by a substrate. For example, a free-standing structure can sustain the weight of itself when it is hoisted by a portion thereof without any significant damage to its structural integrity. The free-standing structure of the carbon nanotube film structure 151 is realized by the carbon nanotubes joined by van der Waals attractive force. So, if the carbon nanotube film structure 151 is placed between two separate supporters, a portion of the carbon nanotube film structure 151 not in contact with the two supporters, would be suspended between the two supporters and yet maintain film structural integrity.

The carbon nanotube film structure 151 includes a plurality of carbon nanotubes uniformly distributed therein, and joined by van der Waals attractive force therebetween. The carbon nanotubes in the carbon nanotube film structure 151 can be orderly or disorderly arranged. The term 'disordered carbon nanotube film structure' includes, but is not limited to, a structure where the carbon nanotubes are arranged along many different directions, such that the number of the carbon nanotubes arranged along each different direction can be almost the same (e.g. uniformly disordered), and/or entangled with each other. 'Ordered carbon nanotube film structure' includes, but is not limited to, a structure where the carbon nanotubes are arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube film structure 151 can be single-walled, double-walled, and/or multi-walled carbon nanotubes.

Macroscopically, the carbon nanotube film structure 151 may have a substantially planar structure. The planar carbon nanotube structure can have a thickness of about 0.5 nanometers to about 100 microns. The carbon nanotube film structure 151 includes a plurality of carbon nanotubes and defines a plurality of micropores 1511 having a size of about 1 nanometer to about 10 micrometers. The carbon nanotube film structure 151 includes at least one carbon nanotube film, the at least one carbon nanotube film includes a plurality of carbon nanotubes substantially parallel to a surface of the corresponding carbon nanotube film.

Figure 6:
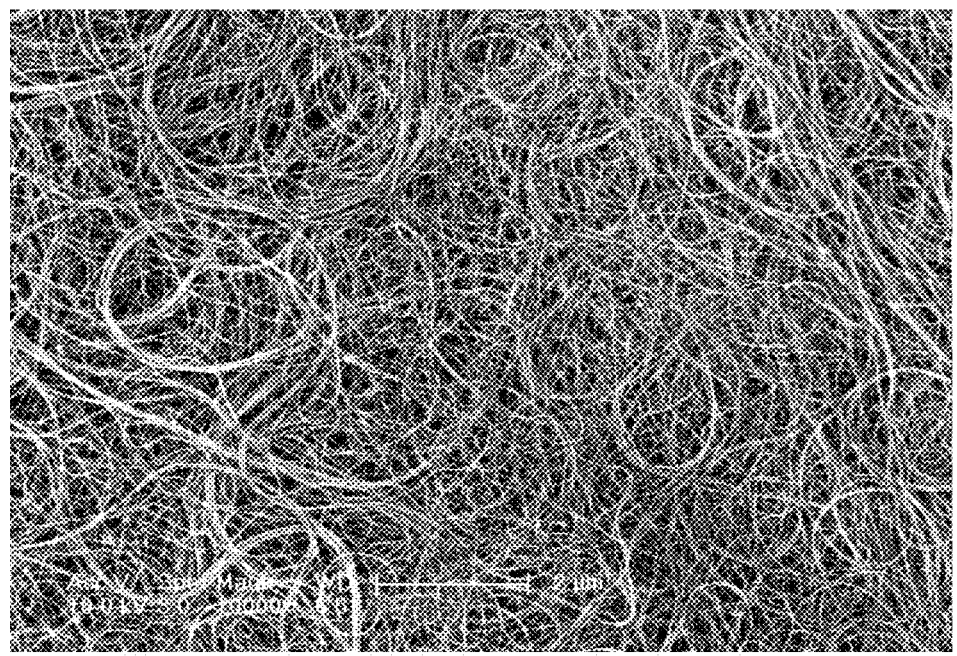
FIG. 6 shows a Scanning Electron Microscope (SEM) image of a flocculated carbon nanotube film.

The carbon nanotube film structure 151 can include a flocculated carbon nanotube film as shown in FIG. 6. The flocculated carbon nanotube film can include a plurality of long, curved, disordered carbon nanotubes entangled with each other and can form a free-standing structure. Further, the flocculated carbon nanotube film can be isotropic. The carbon nanotubes can be substantially uniformly dispersed in the carbon nanotube film. The adjacent carbon nanotubes are acted upon by the van der Waals attractive force therebetween, thereby forming an entangled structure with micropores 1511 defined therein. Alternatively, the flocculated carbon nanotube film is very porous. Sizes of the micropores 1511 can be about 1 nanometer to about 10 micrometers. Further, due to the carbon nanotubes in the carbon nanotube structure being entangled with each other, the carbon nanotube film structure 151 employing the flocculated carbon nanotube film has excellent durability, and can be fashioned into desired shapes with a low risk to the integrity of carbon nanotube structure. The flocculated carbon nanotube film, in some embodiments, will not require the use of structural support or due to the carbon nanotubes being entangled and adhered together by van der Waals attractive force therebetween. The flocculated carbon nanotube film can have a thickness of about 0.5 nanometers to about 100 microns.

Figure 7:
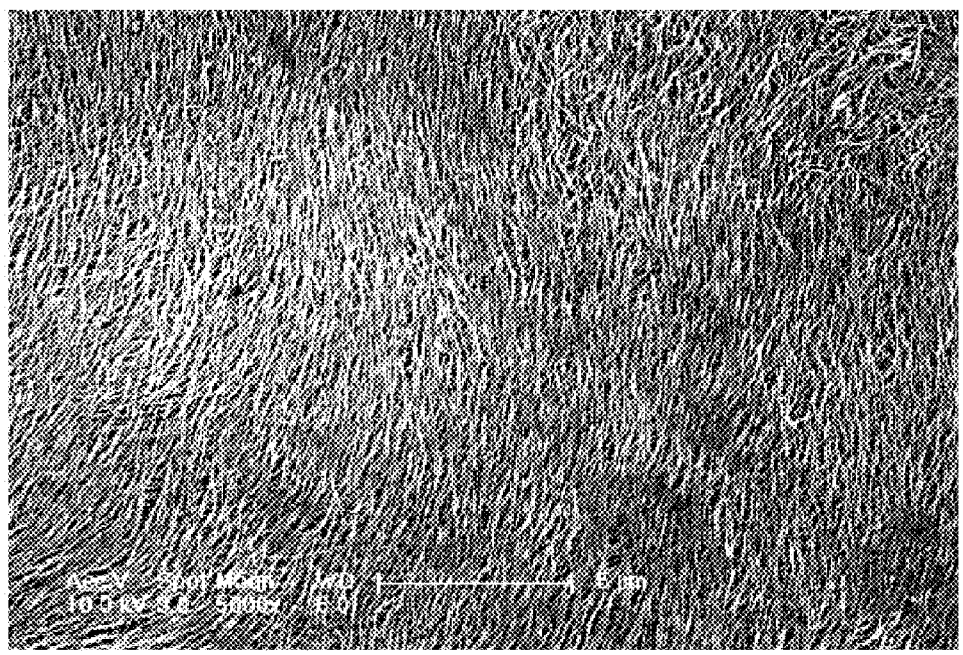
FIG. 7 shows an SEM image of a pressed carbon nanotube film.

The carbon nanotube film structure 151 can include a pressed carbon nanotube film. The carbon nanotubes in the pressed carbon nanotube film can be arranged along a same direction or arranged along different directions. The carbon nanotubes in the pressed carbon nanotube film can rest upon each other. The adjacent carbon nanotubes are combined and attracted to each other by van der Waals attractive force, and can form a free-standing structure. An angle between a primary alignment direction of the carbon nanotubes and a surface of the pressed carbon nanotube film can be in a range from approximately 0 degrees to approximately 15 degrees. The pressed carbon nanotube film can be formed by pressing a carbon nanotube array. The angle is closely related to pressure applied to the carbon nanotube array. The greater the pressure, the smaller the angle. The carbon nanotubes in the carbon nanotube film can be substantially parallel to the surface of the carbon nanotube film when the angle is about 0 degrees. A length and a width of the carbon nanotube film can be set as desired. The pressed carbon nanotube film can include a plurality of carbon nanotubes substantially aligned along one or more directions. The pressed carbon nanotube film can be obtained by pressing the carbon nanotube array with a pressure head. Alternatively, the shape of the pressure head and the pressing direction can determine the direction of the carbon nanotubes arranged therein. Specifically, in one embodiment, when a planar pressure head is used to press the carbon nanotube array along the direction substantially perpendicular to a substrate. A plurality of carbon nanotubes pressed by the planar pressure head may be sloped in many directions. In another embodiment, as shown in FIG. 7, when a roller-shaped pressure head is used to press the carbon nanotube array along a certain direction, the pressed carbon nanotube film having a plurality of carbon nanotubes substantially aligned along the certain direction can be obtained. In another embodiment, when the roller-shaped pressure head is used to press the carbon nanotube array along different directions, the pressed carbon nanotube film having a plurality of carbon nanotubes substantially aligned along different directions can be obtained. The pressed carbon nanotube film can have a thickness of about 0.5 nanometers to about 100 microns, and can define a plurality of micropores 1511 having a diameter of about 1 nanometer to about 10 micrometers.

Figure 8:
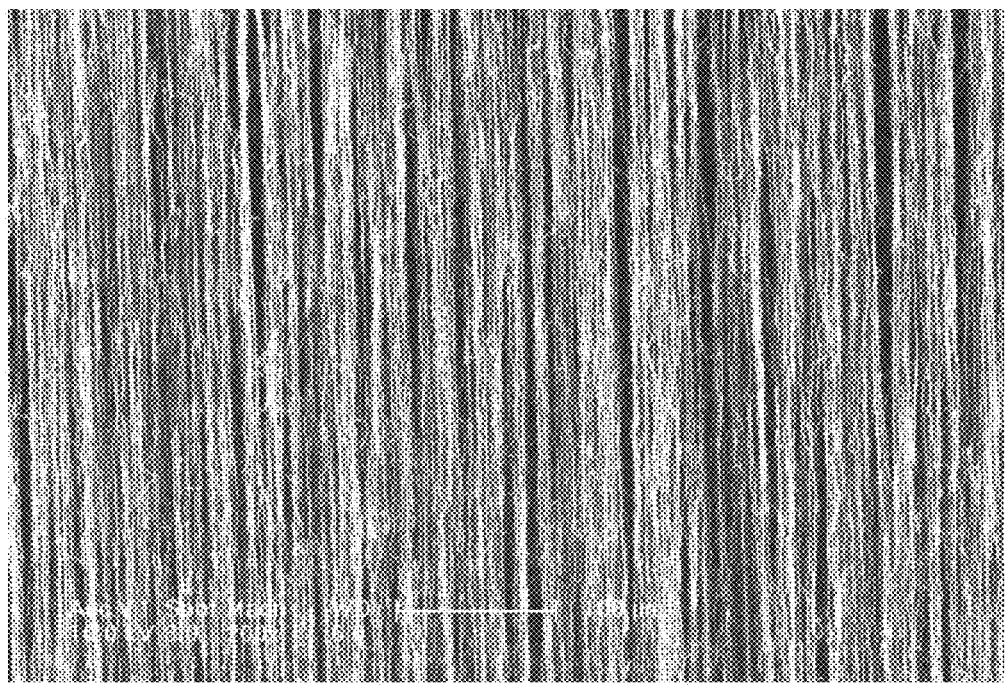
FIG. 8 shows an SEM image of a drawn carbon nanotube film.

In some embodiments, the carbon nanotube film structure 151 includes at least one drawn carbon nanotube film as shown in FIG. 8. The drawn carbon nanotube film can have a thickness of about 0.5 nanometers to about 100 microns. The drawn carbon nanotube film includes a plurality of carbon nanotubes that can be arranged substantially parallel to a surface of the drawn carbon nanotube film. A plurality of micropores 1511 having a size of about 1 nanometer to about 10 micrometers can be defined by the carbon nanotubes. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. More specifically, the drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. A small number of the carbon nanotubes are randomly arranged in the drawn carbon nanotube film, and has a small, if not negligible, effect on the larger number of the carbon nanotubes in the drawn carbon nanotube film arranged substantially along the same direction. The carbon nanotube film is capable of forming a free-standing structure. The term "free-standing structure" can be defined as a structure that does not have to be supported by a substrate. The free-standing structure of the drawn carbon nanotube film is realized by the successive segments joined end to end by van der Waals attractive force.

Understandably, some variation can occur in the orientation of the carbon nanotubes in the drawn carbon nanotube film as can be seen in FIG. 8. Microscopically, the carbon nanotubes oriented substantially along the same direction may not be perfectly aligned in a straight line, and some curve portions may exist. Furthermore, it can be understood that some carbon nanotubes located substantially side by side and oriented along the same direction and in our contact with each other.

Figure 9:
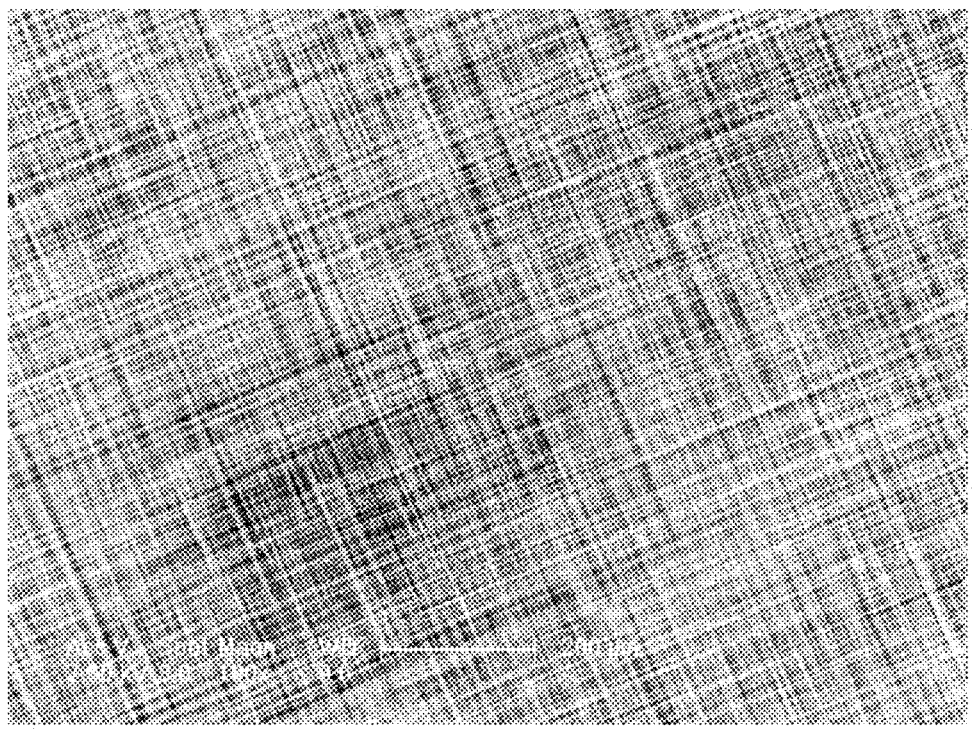
FIG. 9 shows an SEM image of a carbon nanotube film structure consisting of a plurality of stacked drawn carbon nanotube films.

Referring to FIG. 9, in one embodiment, the carbon nanotube film structure 151 includes a plurality of stacked drawn carbon nanotube films. The number of the layers of the drawn carbon nanotube films is not limited. Adjacent drawn carbon nanotube films can be adhered by only van der Waals attractive forces therebetween. An angle can exist between the carbon nanotubes in adjacent drawn carbon nanotube films. The angle between the aligned directions of the adjacent drawn carbon nanotube films can range from about 0 degrees to about 90 degrees. In one embodiment, the angle between the aligned directions of the adjacent drawn carbon nanotube films is substantially 90 degrees, thus a plurality of substantially uniform micropores 1511 are defined by the carbon nanotube film structure 151.

If the carbon nanotubes of the carbon nanotube film structure 151 are aligned along one direction or some predetermined directions, a larger strength and Young's modulus can be achieved along the direction of the carbon nanotubes in the carbon nanotube film structure 151. Therefore, by arranging the carbon nanotube film structure 151 to set the carbon nanotubes therein aligned along a particular direction, the strength and Young's modulus of the diaphragm 150 along this direction can be improved.

The amorphous carbon structure 152 can be infiltrated into the micropores 1511. "Amorphous carbon" is an allotrope of carbon that does not have any crystalline structure. The amorphous carbon has no long-range crystalline order therein. A short-range order can exist, but with deviations of the interatomic distances and/or inner-bonding angles with respect to a graphite lattice as well as to a diamond lattice. The amorphous carbon structure 152 can include a plurality of amorphous carbon particles 1521 in the micropores 1511. The amorphous carbon particles 1521 can be combined by covalent bonds therebetween. The amorphous carbon particles 1521 can adhere to the carbon nanotubes or warp the carbon nanotubes. Van der Waals attractive forces and covalent bonds therebetween can combine the amorphous carbon particles 1521 and the carbon nanotubes. The covalent bonds can be an $sp^2$ hybridized bond or an $sp^3$ hybridized bond between carbon atoms. A plurality of amorphous carbon particles 1521 can also be disposed on opposite surfaces of the carbon nanotube film structure 151 to form two amorphous carbon layers. Thus, the amorphous carbon structure 152 can wrap the carbon nanotube film structure 151. A cavernous shaped structure can be formed by the amorphous carbon structure 152. The carbon nanotube film structure 151 can be embedded in the cavernous structure.

Both the carbon nanotubes of the carbon nanotube film structure 151 and the amorphous carbon particles 1521 of the amorphous carbon structure 152 are carbon materials. Thus, a density of the diaphragm 150 can be smaller. A higher energy conversion efficiency of the loudspeaker 100 can be obtained. The carbon nanotubes and the amorphous carbon particles 1521 are combined by the covalent bonds therebetween. A stress and a tensility formed by the diaphragm 150 can be borne by most of the carbon nanotubes and the amorphous carbon particles 1521, when the diaphragm 150 moves up and down with the bobbin 140. Thus, a larger strength and Young's modulus of the diaphragm 150 can be achieved. A higher volume of the loudspeaker 100 can be obtained.

Figure 10:
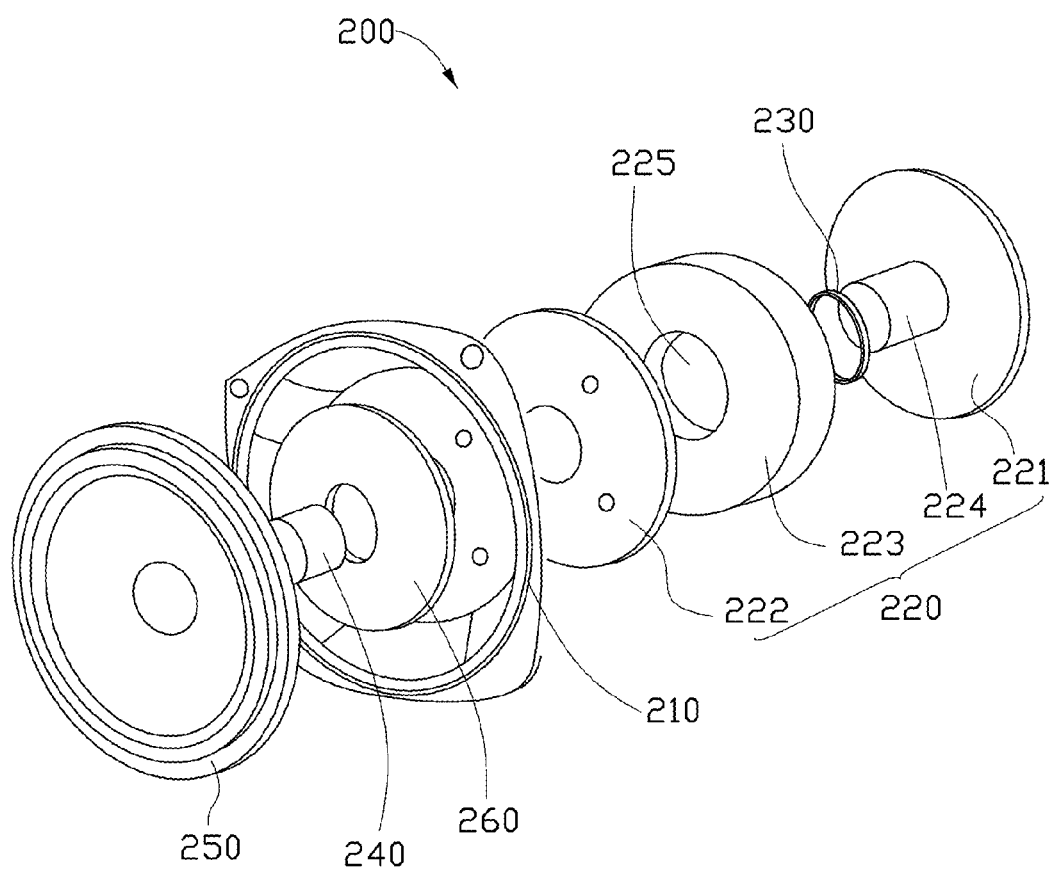
FIG. 10 is a schematic structural view of an embodiment of a loudspeaker.

Referring to FIG. 10, another embodiment of a loudspeaker 200 is shown. The loudspeaker 200 can include a frame 210, a magnetic circuit 220, a voice coil 230, a bobbin 240, a diaphragm 250 and a damper 260.

The frame 210 can be mounted on an upper side of the magnetic circuit 220. The voice coil 230 can be received in the magnetic circuit 220. The voice coil 230 can wind around the voice coil bobbin 240. An outer rim of the diaphragm 250 can be fixed to an inner rim of the frame 210, and an inner rim of the diaphragm 250 can be fixed to an outer rim of the bobbin 240 placed in the magnetic circuit 220. The diaphragm 250 includes a carbon nanotube film structure and an amorphous carbon structure composited with the carbon nanotube film structure to form a stratiform composite structure. The magnetic circuit 220 includes a lower plate 221, an upper plate 222, a magnet 223, and a center pole 224. The magnet 223 is sandwiched by the lower plate 221 and the upper plate 222. The upper plate 222 and the magnet 223 are circular, and define a substantially cylindrical shaped space in the magnetic circuit 220. The center pole 224 extends from the lower plate 221 to the upper plate 222 to define a magnetic gap 225 with the magnet 223.

Figure 11:
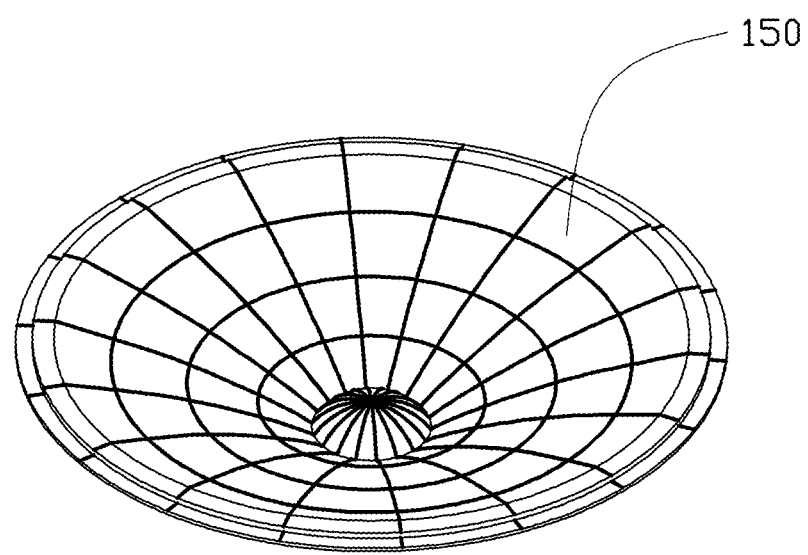
FIG. 11 is a schematic structural view of an embodiment of a diaphragm.

The compositions, features and functions of the loudspeaker 200 in the embodiment shown in FIG. 10 are similar to the loudspeaker 100 in the embodiment shown in FIG. 1, except that the carbon nanotube film structure can include at least one carbon nanotube wire structure. The at least one carbon nanotube wire structure can include a plurality of carbon nanotubes joined end to end by van der Waals attractive force therebetween along an axial direction. The at least one carbon nanotube wire structure includes one or more carbon nanotube wires. The carbon nanotube wires can be substantially parallel to each other to form a bundle-like structure or twisted with each other to form a twisted structure. The bundle-like structure and the twisted structure are two kinds of linear shaped carbon nanotube structure. The plurality of carbon nanotube wire structures can be woven together to form a planar shaped carbon nanotube structure. Referring to FIG. 11, the carbon nanotube film structure can include a plurality of carbon nanotube wire structures, wherein some carbon nanotube wire structures can be arranged along the radial direction of the diaphragm 250, and the other carbon nanotube wire structures can be arranged to have a plurality of homocentric circular structures. The plurality of circular structures and the diaphragm 250 can be homocentric with each other. Thus, the carbon nanotube wire structures of carbon nanotube film structure can be woven to together to form a cobweb shaped carbon nanotube structure.

Figure 12:
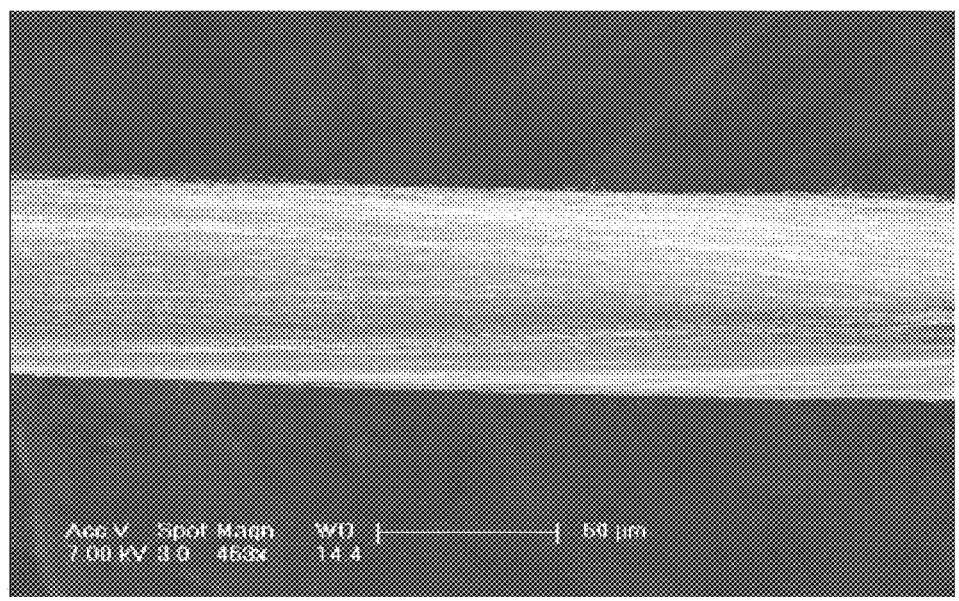
FIG. 12 shows an SEM image of an untwisted carbon nanotube wire.

The carbon nanotube wire can be untwisted or twisted. Treating the drawn carbon nanotube film with a volatile organic solvent can obtain the untwisted carbon nanotube wire. In one embodiment, the organic solvent can be applied to soak the entire surface of the drawn carbon nanotube film. During the soaking, adjacent substantially parallel carbon nanotubes in the drawn carbon nanotube film will bundle together, due to the surface tension of the organic solvent as it volatilizes, and thus, the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire) as shown in FIG. 12. The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. The length of the untwisted carbon nanotube wire can be arbitrarily set as desired. A diameter of the untwisted carbon nanotube wire ranges from about 0.5 nanometers to about 100 micrometers.

Figure 13:
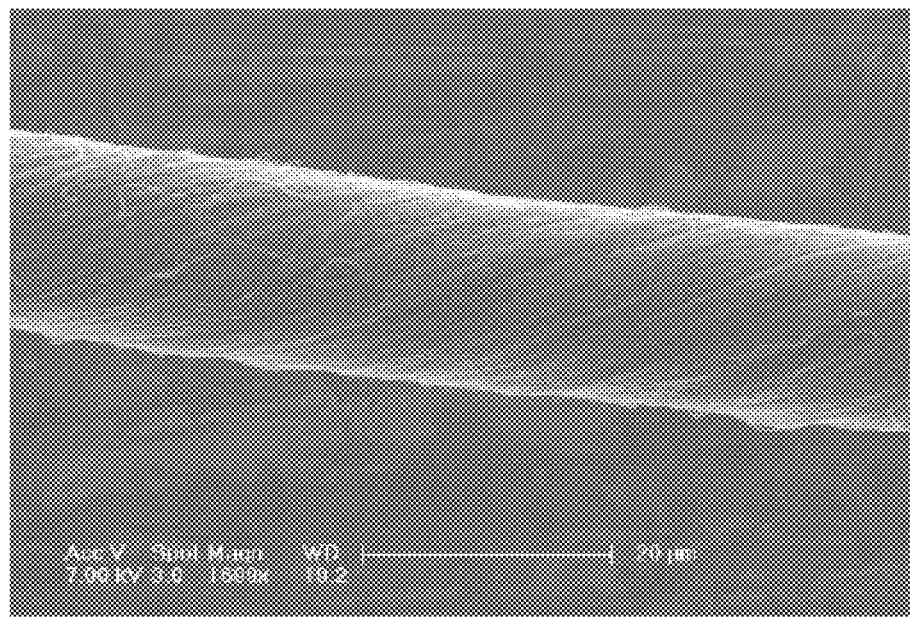
FIG. 13 shows an SEM image of a twisted carbon nanotube wire.

The twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire as shown in FIG. 13. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nanometers to about 100 micrometers.

The carbon nanotube wire can be a free-standing structure. The length direction of the carbon nanotube wire can have a larger strength and Young's modulus. Therefore, by arranging the carbon nanotube wire to set the carbon nanotube wire aligned substantially along a particular direction, the strength and Young's modulus of the diaphragm 250 along this direction can be improved.

Figure 14:
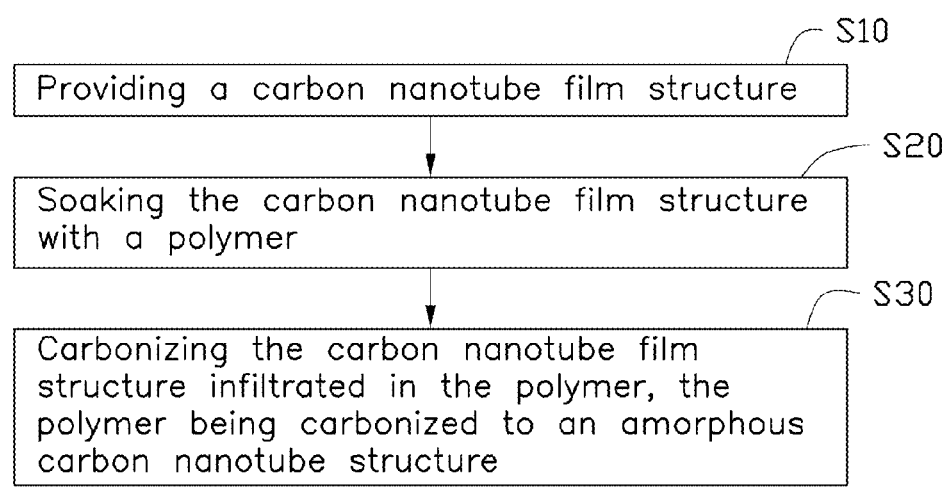
FIG. 14 is a flowchart of the method for making a diaphragm according to one embodiment.

Referring to FIG. 14, one embodiment of a method for making the diaphragm 150, 250 can include following steps:
S10, providing a carbon nanotube film structure;
S20, soaking the carbon nanotube film structure with a polymer; and
S30, carbonizing the carbon nanotube film structure infiltrated in the polymer, the polymer being carbonized to an amorphous carbon structure.

In step S10, the carbon nanotube film structure can be a free-standing structure and define a plurality of micropores.

In step S20, the polymer can include a material of polyacrylonitrile, asphalt, viscose, phenolic, polyacrylate, polystyrene, polybutadiene, or combination thereof. The polymer fills the micropores and composite with the carbon nanotube film structure. The polymer and the carbon nanotube film structure can be combined by van der Waals attractive forces and covalent bonds therebetween. The carbon nanotube film structure can be dipped into the solution with the polymer dissolved therein. Thus, the carbon nanotube film structure can be soaked with the polymer. The carbon nanotube film structure can also be dipped in a solution with a pre-polymer dissolved therein. The pre-polymer can be polymerized into the polymer. Thus, the carbon nanotube film structure with the polymer soaked therein can be obtained. The pre-polymer can include a material of acrylonitrile, ethyl acrylate, butyl acrylate, styrene, butadiene, or combination of thereof.

In step S30, the polymer can be carbonized to the amorphous structure in a carbonization temperature. If the polymer is carbonized in a vacuum or in a place filled with inert gases, the carbonization temperature can be lower than or equal to 1000° C. If the polymer is carbonized in normal atmosphere, the carbonization temperature can be lower than or equal to 500° C. to prevent the carbon nanotubes from being oxidated. The amorphous structure infiltrate into the carbon nanotube film structure and composite with the carbon nanotube film structure to form the diaphragm 150, 250.

It is to be understood that the above-described embodiments are intended to illustrate rather than limit the present disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A method for making a diaphragm, comprising:
   providing a carbon nanotube film structure, wherein the carbon nanotube film structure is a free-standing structure and defines a plurality of micropores;
   soaking the carbon nanotube film structure with a polymer to form a composite, wherein the soaking the carbon nanotube film structure with the polymer comprises the polymer filling the plurality of micropores and combining with the carbon nanotube film structure, and the polymer and the carbon nanotube film structure are combined by van der Waals attractive forces and covalent bonds therebetween; and
   carbonizing the composite comprising the carbon nanotube film structure and the polymer at a carbonization temperature, the polymer being carbonized to form an amorphous carbon structure.

2. The method as claimed in claim 1, wherein the soaking the carbon nanotube film structure with the polymer comprises dipping the carbon nanotube film structure into a polymer solution comprising the polymer and a solvent.

3. The method as claimed in claim 2, wherein the polymer is selected from the group consisting of polyacrylonitrile, asphalt, viscose, phenolic, polyacrylate, polystyrene, and polybutadiene.

4. The method as claimed in claim 1, wherein the soaking the carbon nanotube film structure with the polymer comprises dipping the carbon nanotube film structure into a pre-polymer solution comprising a pre-polymer and a solvent and then polymerizing the pre-polymer to form the polymer.

5. The method as claimed in claim 4, wherein the pre-polymer is selected from the group consisting of acrylonitrile, ethyl acrylate, butyl acrylate, styrene, and butadiene.

6. The method as claimed in claim 1, wherein the carbonization temperature is lower than or equal to 500° C.

7. The method as claimed in claim 1, wherein the carbonizing the composite comprising the carbon nanotube film structure and the polymer is performed in a vacuum or inert gases atmosphere, and the carbonization temperature is lower than or equal to 1000° C.

8. The method as claimed in claim 1, wherein the amorphous carbon structure infiltrates into the carbon nanotube film structure.

9. The method as claimed in claim 1, wherein the carbon nanotube film structure has a contour shape comprising a domed central part and an edge part that is integrally formed with the domed central part; and the edge part extends outwardly and upwardly from a circular edge of the domed central part.

10. A method for making a diaphragm, comprising:
    providing a carbon nanotube film structure comprising a plurality of carbon nanotubes and defining a plurality of micropores therein;
    soaking the carbon nanotube film structure with a polymer to form a composite comprising the carbon nanotube film structure and the polymer; and
    carbonizing the polymer to form an amorphous carbon structure at a carbonization temperature, wherein the amorphous carbon structure comprises a plurality of amorphous carbon particles, and the plurality of carbon nanotubes combines with the plurality of amorphous carbon particles by van der Waals attractive force and covalent bonds therebetween.

11. The method as claimed in claim 10, wherein the soaking the carbon nanotube film structure with the polymer comprises the polymer filling the plurality of micropores and combining with the carbon nanotube film structure.

12. The method as claimed in claim 10, wherein the covalent bonds comprise an $sp^2$ hybridized bond or an sp3 hybridized bond between carbon atoms.

13. The method as claimed in claim 10, wherein the plurality of carbon nanotubes is joined end-to-end by van der Waals attractive force therebetween.

14. The method as claimed in claim 10, wherein the carbonization temperature is lower than or equal to 500° C.

* * * * *